UNITED STATES PATENT OFFICE.

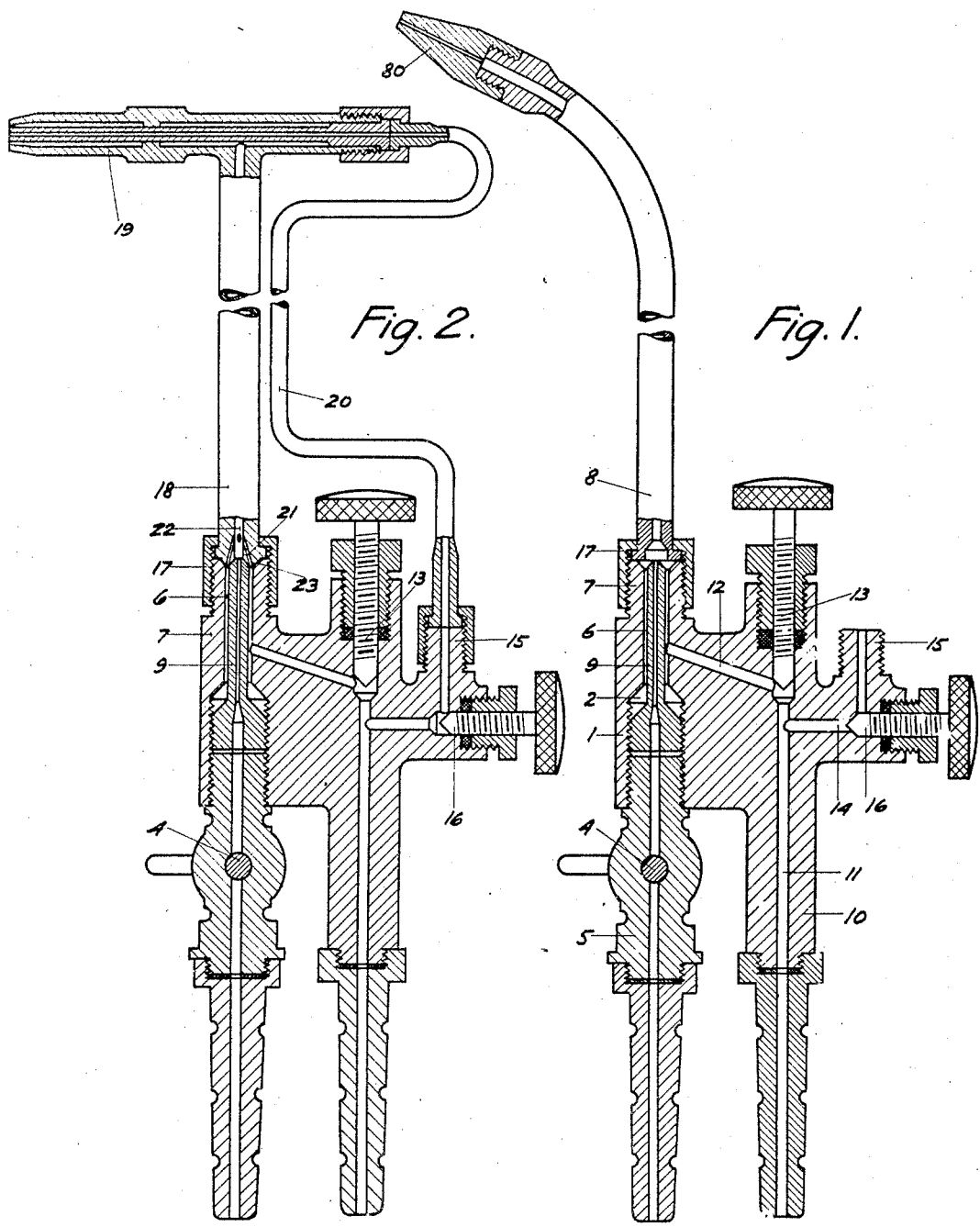

AXEL VIKTOR JOHANSON, OF STOCKHOLM, SWEDEN.

AUTOGENOUS-WELDING APPARATUS.

1,357,324.  Specification of Letters Patent.  Patented Nov. 2, 1920.

Application filed April 22, 1919. Serial No. 291,943.

*To all whom it may concern:*

Be it known that I, AXEL VIKTOR JOHANSON, subject of the King of Sweden, residing at 153 Åsögatan, Stockholm, Sweden, have invented certain new and useful Improvements in Autogenous-Welding Apparatus, of which the following is a specification.

The present invention relates to an autogenous welding apparatus, which can be easily changed to a fusing apparatus. The characteristic feature of the invention consists in that the valve box of the welding apparatus is provided with an extra oxygen gas outlet controlled through a valve so that after the removing of the removably mounted welding burner a fusing burner having a separate oxygen gas pipe can be connected to the valve box.

The invention is shown in the annexed drawings. Figure 1 is a longitudinal section of the valve box having the welding burner placed thereon, and Fig. 2 is a longitudinal section of the valve box having the fusing burner placed thereon.

Referring more particularly to the drawings especially Fig. 1, the body portion of the apparatus is in the form of a valve box 1 having a threaded bore 2 in which is fitted one of the reduced threaded extensions 5 of a valve 4, the opposite reduced extension of which is designed for connection with an acetylene gas pipe. The bore 2 is reduced to leave a relative narrow duct 6 which passes through a reduced threaded extension in the opposite end of the body portion while the outer end of the duct is flared. Arranged with the extension through the duct 6 is a pipe extension 9 which is integral with the adjacent reduced extension 5 of the valve 4, the outer end of the pipe 9 being tapered. In addition the body portion is provided with a reduced threaded extension 10 for association with an oxygen gas pipe. Provided through the body portion and the extension 10 is a secondary duct 11 which has a branch duct 14 leading therefrom and connected with the duct 6, a valve 13 of the needle type being mounted in the body portion for controlling the passage of the gas through duct 12.

The body portion is further provided with another reduced extension or junction piece 15 while arranged through the said extension and the adjacent portion of the body is a duct which has a branch duct 14 leading therefrom, the flow of gas through which is controlled by a manually operable valve 16 as will be observed. The reduced extension 15 is adapted to engage the oxygen gas pipe of a fusing burner.

In using the welding apparatus shown in Fig. 1, the valves 4 and 13 are held open, while the valve 16 is closed. The acetylene gas thereby passes through the pipe 9, while the oxygen gas enters into the duct 6 surrounding the said pipe, and then the gases are mixed when entering into the mixing pipe 8 of the welding burner 80. The oxygen supply is controlled by the valve 13.

The mixing pipe 8 is removably secured to the junction piece 7 by means of a nut 17. After unscrewing the said nut the pipe 8 together with the welding burner may be removed, and the main pipe 18 of a fusing burner 19 having a separate oxygen gas pipe 20 may be secured to the junction pipe by means of the nut 17. The oxygen gas pipe 20 may be secured in a similar manner to the threaded extension 15, as shown in Fig. 2. The main pipe 18 of the said fusing burner is provided at the end adapted to be connected to the threaded extension 7 with a number (for instance 4) of obliquely arranged ducts 21 adapted to connect the duct 6 surrounding the pipe 9 with the central duct 22 of the pipe 18. In order that the pipe 18 may be securely held in proper position relatively to the threaded extension 7, so that the ducts 21 will always communicate with the duct 6, the end of the pipe 18 is provided with an annular conical flange 23, which enters into a correspondingly shaped recess at the end of the threaded extension 7.

In using the fusing burner the valves 4 and 16 are held open, so that the acetylene gas passes through the pipe 9 to the pipe 18, while the oxygen gas enters into the pipe 20. Besides, the valve 13 is opened more or less in order to allow the oxygen gas to pass to the duct 6 surrounding the pipe 9, whereby the said gas enters through the ducts 21 to the central duct 22 of the pipe 18 and is mixed with the acetylene gas. The fusing burner is constructed in a known manner and will, therefore, not be particularly described.

Thus, by the described form of the body portion a welding burner may in a simple manner be changed to a fusing burner or vice versa and, consequently, it is not necessary in performing welding and fusing operations to have the disposal of two complete apparatuses, as heretofore required.

Having now described my invention what I claim as new and desire to secure by Letters Patent is:

In an apparatus of the character described in combination, a body portion provided with a bore one end of which is enlarged and threaded, a valve having a threaded extension engaged with the threaded bore and having the outer portion of such extension reduced and arranged within and in spaced relation to the reduced portion of the bore, the valve and its extension being provided with a bore through which a supply of acetylene gas is controlled, the body portion being also provided with a valve controlled duct communicating with the reduced portion of the bore and to which oxygen is supplied in the regulated manner, and a burner having a stem provided with a longitudinal bore connected to the body portion so that the bore communicates with the bore in the valve extension, and the stem being also provided with a plurality of obliquely arranged ducts extending from the bore of the stem to the outer edge of the stem so as to communicate with the reduced portion of the bore and serving as a means for permitting of the passage of oxygen from the reduced portion of the bore of the body portion to bore in the stem of the burner.

In testimony whereof I have affixed my signature in presence of two witnesses.

AXEL VIKTOR JOHANSON.

Witnesses:
  AXEL EHRNER,
  GRETA PRIEN.